UNITED STATES PATENT OFFICE 2,087,689

2,4-DINITRO-3,6-DIHALOGENANILINES AND A PROCESS FOR THEIR MANUFACTURE

Oskar Knecht and Otto Charles Billeter, Basel, Switzerland, assignors to the firm of Chemical Works, formerly Sandoz, Basel, Switzerland No Drawing. Application November 9, 1935, Serial No. 49,111. In Switzerland November 24, 1934

7 Claims. (Cl. 260—130.5)

The present invention relates to new 2,4-dinitro-3,6-dihalogenanilines and to a process for their manufacture.

It has been found that by nitration of compounds of the general formula:

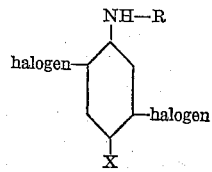

wherein X represents hydrogen or a nitro group and R represents hydrogen, a sulphoalkyl and sulphoaryl group and whereby when X is hydrogen, R must represent a sulphoalkyl or sulphoaryl group, there can be obtained 2,4-dinitro-3,6-dihalogenanilines with a very good yield.

In order to prepare the desired compounds, the nitration of the starting compounds can be carried out in presence or absence of sulphuric acid, whereby it is generally advantageous to work under good stirring, in order to obtain an intimate mixture of the reagents.

By subjecting for example the 3,6-dichloro-4-nitroaniline to the nitration with concentrated nitric acid, preferably at a temperature below 10° C., the formation of 3,6-dichloro-4-nitrophenyl-nitramine occurs first, this compound being then transformed into the dinitro derivative by subsequent treatment with sulphuric acid. But if the same starting compound is nitrated in a mixture consisting of nitric and sulphuric acid and at a temperature above 0° C., the dinitro derivative becomes formed in one operation.

By subjecting to the nitrating operation, preferably at a temperature above 0° C., compounds like methane-sulphonyl-3,6-dichloroaniline or benzene- or p-toluene-sulphonyl-3,6-dichloro-aniline, both nitro groups will be introduced into the benzene ring on treating the above said compounds with nitric acid of appropriate strength. By splitting off the sulphonyl radical, the desired dinitrodihalogen compounds will then be obtained.

The compounds prepared according to the present invention possess the general formula

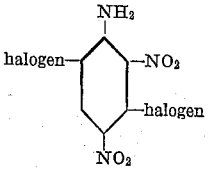

They have an orange color, are insoluble in water, but soluble in hot organic solvents such as ethanol, benzene, toluene, solvent naphtha, etc. They can be diazotized and can, therefore, be used as an intermediate product for the manufacture of azo dyestuffs.

One object of the present invention is, therefore, the production of the 2,4-dinitro-3,6-dihalogenanilines of the general formula

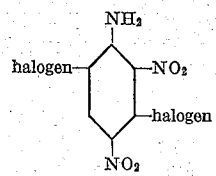

wherein halogen means chlorine and bromine, which are orange coloured compounds, insoluble in water, but soluble in hot ethanol, benzene, toluene and solvent-naphtha.

Another object of the present invention is a process for the manufacture of 2,4-dinitro-3,6-dihalogenanilines, consisting in first treating 3,6-dihalogen-4-nitranilines with concentrated nitric acid at a temperature below 10° C. and subjecting then the 3,6-dihalogen-4-phenylnitramines thus obtained to the action of sulphuric acid.

Another object of the present invention is a process for the manufacture of 2,4-dinitro-3,6-dihalogen-anilines, consisting in nitrating 3,6-dihalogen-4-nitranilines in presence of sulphuric acid, at a temperature below 50° C.

Still another object of the present invention is a process for the manufacture of 2,4-dinitro-3,6-dihalogenanilines, consisting in first subjecting alkyl- or arylsulphonyl-3,6-dihalogenanilines to the action of concentrated nitric acid at a temperature above 0° C. and thereupon to a saponification with sulphuric acid in order to split off the sulphonyl group.

The following examples illustrate the present process, the parts being by weight:

Example 1

207 parts of 3,6-dichloro-4-nitraniline are dissolved at ordinary temperature in 1000 parts of sulphuric acid-monohydrate, cooled down to −5° C. and treated at a temperature of −5 to 0° C. with 126 parts of a mixture containing equal parts of sulphuric and nitric acid. The reaction mixture is then stirred at 0° C. during one hour and allowed to run into 4000 parts of ice. The 2,4-dinitro-3,6-dichloroaniline thereby precipitated is filtered and washed with water until neutral. In order to separate some impurities soluble in alkali, the raw product is suspended in 4000 parts of water, treated with caustic soda and filtered again. In order to obtain the new compound in perfectly pure state, it can be recrystallized from ethanol, whereby orange to orange-brown needles, melting at 168° C., are obtained.

The new compound is soluble in most of the organic solvents. It is rather easily soluble in warm ethanol, benzene, toluene and solvent naphtha, rather difficultly soluble in the same solvents at low temperature.

*Example 2*

296 parts of 3,6-dibromo-4-nitraniline of the melting point 175° C. are dissolved in 1480 parts of sulphuric acid-monohydrate and treated at —5 to 0° C. with 126 parts of a mixture consisting of equal parts of sulphuric and nitric acid. After stirring for one hour at 0° C., the reaction mixture is introduced into 5000 parts of ice, the 2,4 - dinitro - 3,6 - dibromoaniline filtered and washed. After recrystallization from ethanol the compound is obtained in form of orange prismatic needles, melting at 155° C.

*Example 3*

1 part of 3,6-dichloro-4-nitraniline is added in portions to 2 parts of nitric acid of 98 per cent strength at a temperature of —15 to —20° C. and the mixture stirred during one hour at about this temperature. The crystals that are formed in the reaction mixture are then separated by filtration, washed with concentrated nitric acid, then with water and dried. 1 part of the 3,6-dichloro-4-nitrophenyl-nitramine obtained in this manner is introduced at a low temperature into 5 parts of concentrated sulphuric acid, stirred until a solution is obtained, and allowed to run into ice. The 2,4-dinitro-3,6-dichloroaniline thereby obtained is identical with the product of Example 1.

*Example 4*

25 parts of methanesulphonyl-3,6-dichloroaniline are introduced into 100 parts of nitric acid of specific weight 1.4 and the mixture is boiled at reflux, until the starting product is completely dissolved. By cooling down, the methanesulphonyl-3,6-dichloro-2,4-dinitraniline crystallizes out and can be separated by filtration. On recrystallization from ethanol thin needles of the melting point 172° C. are obtained.

In order to split off the methanesulphonyl radical, 100 parts of the product obtained as above described are introduced into 300 parts of sulphuric acid of 66° Bé., stirred for a short time at 80° C., until the product becomes dissolved and a test shows, that the alkali soluble product has completely disappeared. The reaction mixture is then allow to run into ice-water, whereby 3,6-dichloro-2,4-dinitraniline precipitates. The same can be isolated in the usual manner.

*Example 5*

40 parts of p-toluenesulphonyl-3,6-dichloroaniline of the melting point 144–145° C. are slowly introduced into 100 parts of nitric acid of 98 per cent strength, whereby care is taken that the temperature does not exceed 50° C. The mixture thereby obtained is then stirred at this temperature during some hours and then boiled at reflux during one hour. On cooling down, the nitration product precipitated out is filtered, washed with nitric acid of 60 per cent strength and with water and recrystallized from ethanol, whereby white needles melting at 208° C. are obtained.

The N-(3'-nitro-4'-methylbenzenesulphonyl)-3,6-dichloro-2,4-dinitraniline obtained in this manner is then saponified in the manner described in Example 4 and yields besides 3,6-dichloro-2,4-dinitraniline also o-nitro-toluenesulphonic acid.

*Example 6*

15 parts of N-para-toluenesulphonyl-4-nitro-3,6-dichloroaniline are slowly introduced into 100 parts of nitric acid of specific weight 1.52 and the mixture obtained is heated to the boil for a short time. On cooling down, the nitration product crystallizes out. It is identical with the product obtained according to Example 5.

The saponification can be carried out as it has been described in Example 4.

What we claim is:—

1. The 2,4-dinitro-3,6-dihalogenanilines of the general formula:

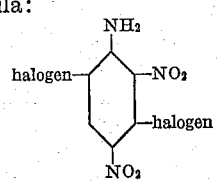

wherein halogen is one of the group chlorine and bromine, which are orange colored compounds insoluble in water, but easily soluble in warm organic solvents.

2. The 2,4-dinitro-3,6-dichloroaniline of the formula:

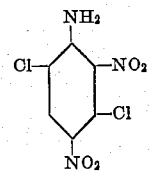

3. The 2,4-dinitro-3,6-dibromoaniline of the formula:

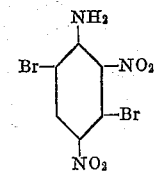

4. A process for the manufacture of 2,4-dinitro-3,6-dihalogenanilines, consisting in subjecting compounds of the general formula:

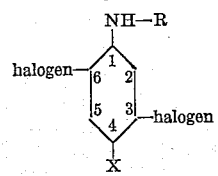

wherein halogen is one of the group chlorine and bromine and X is one of the group hydrogen and nitro and R represents a substituent selected from the class consisting of hydrogen, sulphoalkyl and sulphoaryl group, and whereby when X is hydrogen, R must represent a sulphoalkyl or sulphoaryl group, to a nitrating operation and when R represents a sulphoalkyl or sulphoaryl group, treating the nitrated product with sulphuric acid at a temperature of 50–100° C. in order to split off the sulphonyl group.

5. A process for the manufacture of 2,4-dinitro-3,6-dihalogenanilines, consisting in treating compounds of the general formula:

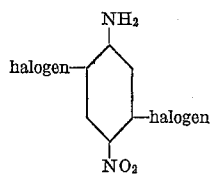

wherein halogen is one of the group chlorine and bromine, with concentrated nitric acid at a temperature of —20° to —10° C., and subjecting the 3,6-dihalogeno-4-nitrophenylnitramine thus obtained to a treatment with sulphuric acid at room temperature.

6. A process for the manufacture of 2,4-dinitro-3,6-dihalogenanilines, consisting in treating compounds of the general formula:

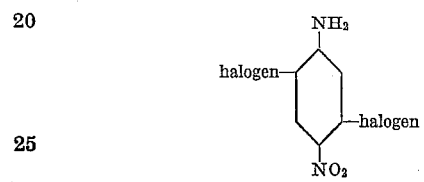

wherein halogen is one of the group chlorine and bromine, with nitric acid in presence of sulphuric acid at a temperature between —10° and +20° C.

7. A process for the manufacture of 2,4-dinitro-3,6-dihalogenanilines, consisting in treating compounds of the general formula:

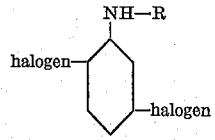

wherein halogen is one of the group chlorine and bromine and R represents a group selected from the class consisting of sulphoalkyl and sulphoaryl group, with aqueous nitric acid at a temperature 80–100° C., and in subjecting the nitro-derivatives thus obtained to a treatment with sulphuric acid in order to split off the sulphoalkyl or sulphoaryl group.

OSKAR KNECHT.
OTTO CHARLES BILLETER.